US012619601B2

(12) United States Patent
Darapuneni et al.

(10) Patent No.: US 12,619,601 B2
(45) Date of Patent: May 5, 2026

(54) EDITING DATA WITHIN A DATA VISUALIZATION TOOL

(71) Applicant: KPMG International Services Limited, London (GB)

(72) Inventors: Yoga Jaideep Darapuneni, Denver, CO (US); David McManus, Montvale, NJ (US); Jayakumar Pankajatchan, Denver, CO (US)

(*) Notice: Subject to any disclaimer, the term of this patent is extended or adjusted under 35 U.S.C. 154(b) by 0 days.

(21) Appl. No.: 18/801,881

(22) Filed: Aug. 13, 2024

(65) Prior Publication Data

US 2025/0061109 A1     Feb. 20, 2025

Related U.S. Application Data

(60) Provisional application No. 63/519,305, filed on Aug. 14, 2023.

(51) Int. Cl.
G06F 16/23     (2019.01)
G06F 9/54     (2006.01)
G06F 16/26     (2019.01)

(52) U.S. Cl.
CPC .......... G06F 16/2379 (2019.01); G06F 9/547 (2013.01); G06F 16/26 (2019.01)

(58) Field of Classification Search
CPC ...... G06F 16/2379; G06F 9/547; G06F 16/26; G06F 2209/545
See application file for complete search history.

(56) References Cited

U.S. PATENT DOCUMENTS

| | | | | |
|---|---|---|---|---|
| 10,546,056 | B1 * | 1/2020 | Cervelli | ................. G06F 40/177 |
| 2021/0097065 | A1 * | 4/2021 | Beers | .................... G06F 16/248 |
| 2022/0164395 | A1 * | 5/2022 | Setlur | ............... G06F 16/24522 |
| 2023/0237582 | A1 * | 7/2023 | Probetts | ................. G06Q 40/06 705/36 R |
| 2023/0418834 | A1 * | 12/2023 | Pandey | ............... G06F 21/6218 |

* cited by examiner

*Primary Examiner* — Robert W Beausoliel, Jr.
*Assistant Examiner* — Mohammad S Bhuyan

(57)     ABSTRACT

Systems and methods disclosed herein provide for updating data in a database directly from a visualization tool. A client device runs a visualization application that displays a write-back panel that includes one or more data fields to be changed in the database for a specified database column. The visualization application transmits the updated data to a processing application programming interface (API) on a server communicatively coupled to the client device, which updates the database with the updated data for the specified database column and responds with a success or failure message that reflects the update status.

11 Claims, 10 Drawing Sheets

EDITING DATA WITHIN A DATA VISUALIZATION TOOL

CROSS-REFERENCE TO RELATED APPLICATIONS

This application claims the benefit of U.S. Provisional Application No. 63/519,305, filed Aug. 14, 2023.

TECHNICAL FIELD

The disclosed implementations relate generally to data visualization and more specifically to systems, methods, and user interfaces that provide editing functions for editing and updating a data set.

BACKGROUND OF THE INVENTION

Data visualization applications enable a user to understand very large or complex data sets visually, including through visible trends, outliers, and other factors that are important to making business decisions. Various analytic tools can be used to help understand the data, such as regression lines, average lines, and percentile bands. However, at times data within the visualizations may be stale or incorrect. Users are generally required to exit the visualization application, edit the data to update it or make corrections, then refresh the visualization application. This is time consuming and repetitive, especially when dealing with very large or complex data sets.

SUMMARY OF THE INVENTION

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to one aspect, a computer-implemented method is provided for updating data in a database directly from a visualization tool. The method includes displaying a writeback panel via a visualization application on a client device, wherein the writeback panel includes one or more data fields to be changed in the database for a specified database column. The visualization application transmits the updated data to a processing application programming interface (API) on a server communicatively coupled to the client device. The processing API updates the database with the updated data for the specified database column and responds to the visualization application with a success or failure message that reflects the update status.

According to another aspect, an apparatus is provided for updating data in a database directly from a visualization tool. The apparatus includes one or more processors and memory storing a set of instructions. When executed by the one or more processors, the instructions cause the apparatus to display a writeback panel via a visualization application that includes one or more data fields to be changed in the database for a specified database row and database column. The instructions also cause the apparatus to transmit the updated data, via the visualization application, to a processing application programming interface (API) on a server communicatively coupled to the apparatus and receive a response, from the processing API, with a success or failure message that reflects whether the specified database column was updated.

According to a third aspect, a non-transitory machine-readable medium stores instructions that cause the one or more processors to perform steps. The steps include displaying a writeback panel via a visualization application on a client device, wherein the writeback panel includes one or more data fields to be changed in the database for a specified database column. The steps also include transmitting the updated data, by the visualization application, to a processing application programming interface (API) on a server communicatively coupled to the client device, updating the database with the updated data for the specified database column, and responding, by the processing API, with a success or failure message that reflects the update status.

BRIEF DESCRIPTION OF DRAWINGS

The present disclosure is described by way of example and not limited in the accompanying figures in which like reference numerals indicate similar elements and in which.

DETAILED DESCRIPTION OF THE INVENTION

Figure 1:
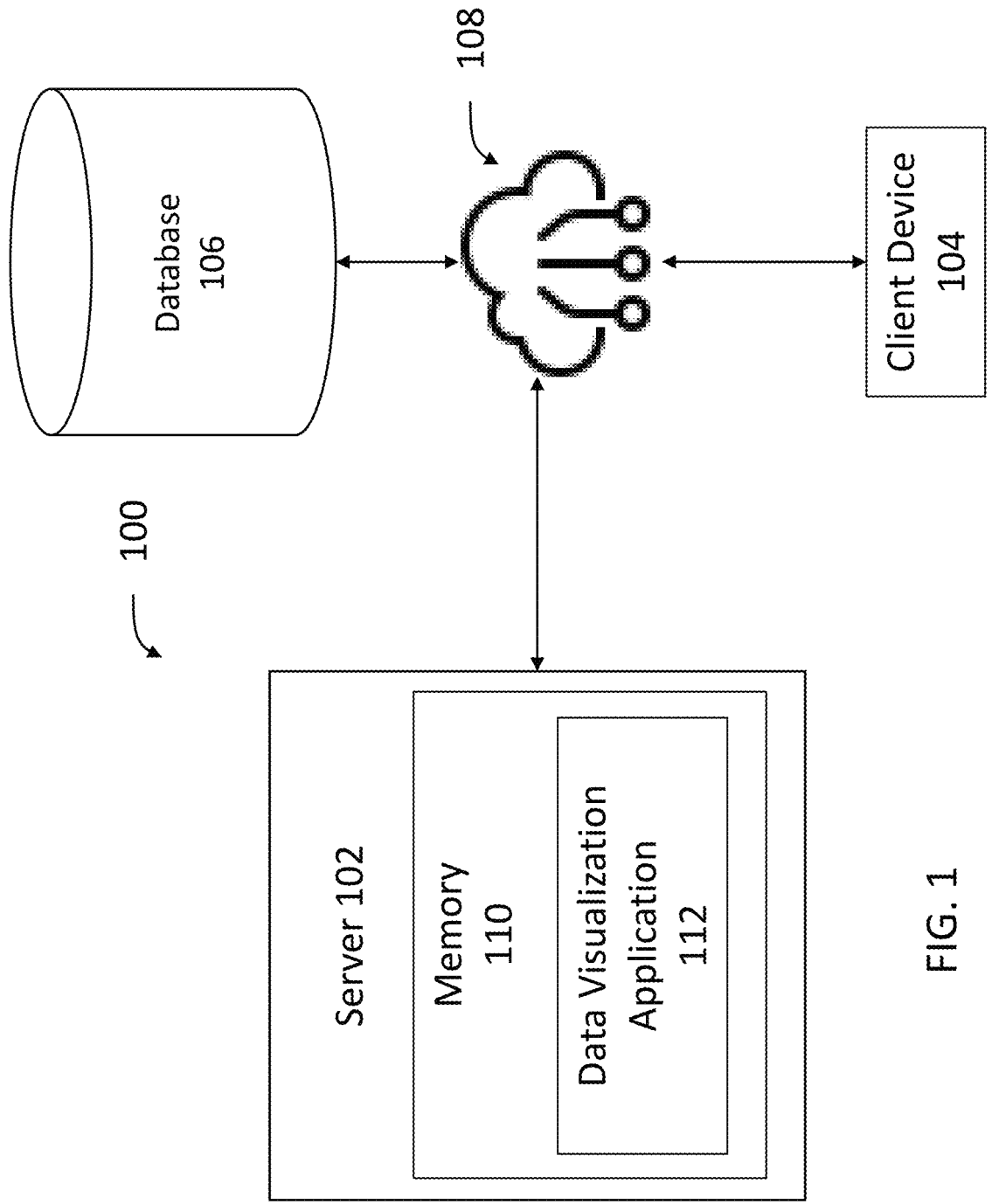
FIG. 1 is a block diagram of a system for analyzing, visualizing, and directly editing data within a visualization.

In the following description of embodiments of the invention, reference is made to the accompanying drawings, which show by way of illustration embodiments in which aspects of the disclosure may be practiced. Other embodiments may be used, and structural or functional modifications may be made without departing from the scope of the present disclosure. Aspects of the disclosure are capable of other embodiments and of being practiced in various ways. In addition, the terminology used in this disclosure are for the purpose of description and should not be regarded as limiting. Rather, the phrases and terms used should be given their broadest interpretation and meaning.

Known techniques for working with data to be analyzed and displayed via visualization tools generally require much manual work. For example, users are generally required to exit the visualization application, edit the data to update it or make corrections, then refresh the visualization application. This is time consuming and repetitive, especially when dealing with very large or complex data sets. Other previous solutions proved unable to connect the visualization application and the database in such a way as to enable in-app changes and automatic refresh. Rather, those solutions added many additional steps and required additional software to be installed on the client and/or server.

The systems, methods, and computer-readable media described herein provide a technical solution to the above problems. Specifically, the technical solution provides the ability to edit data within a database directly from within a visualization tool. Previously a user had to note the changes to be made, exit the visualization tool, make the data edits to the datastore in another manner, then refresh the visualization tool so that the data edits are reflected, or additional resource-intensive software had to be installed on the client and/or server to enable data updates.

The methods, systems, and computer-readable media thus offer several benefits. In particular, the methods, systems, and computer-readable media use a visualization application to perform analysis, visualization, and direct editing of data stored in a database. The methods, systems, and computer-readable media represent an improvement to an existing technology or technologies, specifically technologies for editing visualization data from within the visualization application itself. Technologies do not currently exist for such direct editing. The methods, systems, and computer-readable media therefore do not merely recite the performance of some business practice known from the pre-computer world along with the requirement to perform it on a computer. Rather, the methods, systems, and computer-readable media incorporate API calls and cloud computing environments to enable editing of data. Thus, the systems, methods, and computer-readable media are necessarily rooted in computer technology to overcome a problem specific to data-intensive visualization tools (namely slow speed and high demand on processing and network resources). In addition, the present disclosure includes specific features other than what is well-understood, routine, convention activity in the field, or adding unconventional steps that confine the claim to a particular useful application, e.g., direct API calls to a host application and data processor, as described herein.

FIG. 1 shows a block diagram of a system 100 for analyzing, visualizing, and directly editing data stored in a database using a visualization application. The system 100 comprises one or more servers 102, one or more client devices 104, and a database 106, interconnected via a network 108.

A memory 110 of the server 102 may host one or more applications, such as a data visualization application 112. Application 112 may provide instructions to server 102 allowing server 102 and client device 104 to together perform various actions. Memory 110 may include volatile and nonvolatile, removable and non-removable media implemented in any method or technology for storage of information such as computer-readable instructions, data structures, program modules, or other data. Memory 110 may include one or more physical persistent memory devices and/or one or more non-persistent memory devices.

The client device 104 may access server applications, such as application 112, and/or resources using one or more client applications, such as a web browser or application. A client device 104 may be a mobile device, such as a laptop, smart phone, or tablet, or computing devices, such as a desktop computer or a server.

The database 106 may be configured to maintain, store, retrieve, and update information for the server 102. Further, the database 106 may provide the server 102 with information periodically or upon request. In this regard, the database 106 may be a distributed database capable of storing, maintaining, and updating large volumes of data across clusters of nodes. The database system 106 may provide a variety of databases including, but not limited to, relational databases, hierarchical databases, distributed databases, in-memory databases, flat file databases, XML databases, NoSQL databases, graph databases, and/or a combination of any of these.

The server 102 may be configured with a server application that is capable of interfacing with the client applications and the database 106. In this regard, the server 102 may be a stand-alone server, a corporate server, or a server located in a server farm or cloud-computer environment. According to some examples, the server system may be a virtual server hosted on hardware capable of supporting a plurality of virtual servers.

Regarding the network 108, it should be noted that the network connections shown are illustrative and any means of establishing a communications link between the computers may be used. The existence of any of various network protocols such as TCP/IP, Ethernet, File Transfer Protocol (FTP) or Secure FTP (SFTP), HTTP and the like, and of various wireless communication technologies such as GSM, CDMA, Wi-Fi, LTE, and 5G is presumed, and the various computing devices described herein may be configured to communicate using any of these network protocols or technologies. Any of these devices and systems may be implemented, in whole or in part, using one or more computing systems described below and illustrated by FIG. 2.

Moreover, the network 108 may include any type of network. For example, the network 108 may include a local area network (LAN), a wide area network (WAN), a wireless telecommunications network, and/or any other communication network or combination. It will be appreciated that the network connections shown are illustrative and any means of establishing a communications link between the computers may be used. The existence of any of various network protocols such as TCP/IP, Ethernet, FTP, SFTP, HTTP and the like, and of various wireless communication technologies such as GSM, CDMA, Wi-Fi, LTE, and 5G, is presumed, and the various computing devices described herein may be configured to communicate using any of these network protocols or technologies.

The data transferred to and from various computing devices in system 100 may be any type of data including structured or unstructured data. Moreover, the data may include secure and sensitive data, such as confidential documents, client personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, FTP, SFTP, and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
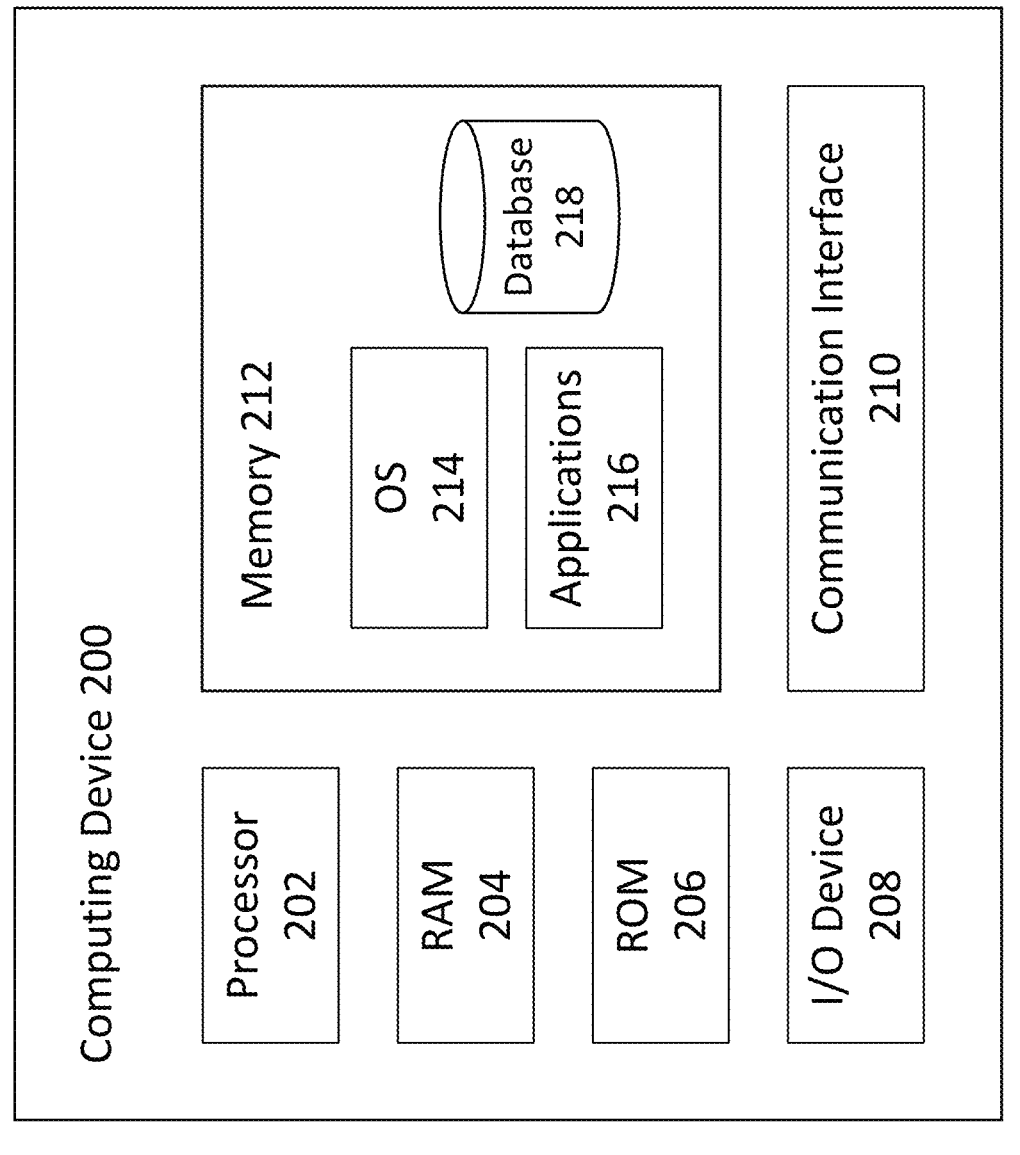
FIG. 2 is a block diagram illustrating a computing device that may be used with the system described in FIG. 1.

FIG. 2 is a block diagram illustrating a computing device 200 that may be used with the server 102 and/or the client device 104 described in FIG. 1. The computing device 200 may include one or more processors 202 for controlling overall operation of the computing device 200 and its associated components, including RAM 204, ROM 206, input/output device 208, communication interface 210, and/or memory 212. A data bus may interconnect processor 202, RAM 204, ROM 206, memory 212, I/O device 208, and/or communication interface 210. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The I/O device 208 may include a microphone, keypad, touch screen, and/or stylus through which a user of the computing device 200 may provide input and may also include one or more of a speaker for providing audio output and a video display device for providing textual, audiovisual, and/or graphical output. Software may be stored within a memory 212 to provide instructions to processor 202 allowing computing device 200 to perform various actions. For example, memory 212 may store software used by the computing device 200, such as an operating system (OS) 214, application programs 216, and/or an associated internal database 218. An example of the application programs 216 storable by memory 212 is the data visualization application 112 of FIG. 1. The various hardware memory units in memory 212 may include volatile and nonvolatile, removable and non-removable media implemented in any method or technology for storage of information such as computer-readable instructions, data structures, program modules, or other data. The memory 212 may include one or more physical persistent memory devices and/or one or more non-persistent memory devices. In some embodiments, RAM 204 and/or ROM 206 may be part of the memory 212 along with electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 202.

The communication interface 210 may include one or more transceivers, digital signal processors, and/or additional circuitry and software for communicating via any network, wired or wireless, using any protocol as described above.

The processor 202 may include a single central processing unit (CPU), which may be a single-core or multi-core processor or may include multiple CPUs. Processor 202 and associated components may allow the computing device 200 to execute a series of computer-readable instructions to perform some or all of the processes described herein. Although not shown in FIG. 2, various elements within memory 212 or other components in computing device 200, may include one or more caches, for example, CPU caches used by the processor 202, page caches used by the OS 214, disk caches of a hard drive, and/or database caches used to cache content from the database 218. For embodiments including a CPU cache, the CPU cache may be used by one or more processors 202 to reduce memory latency and access time. A processor 202 may retrieve data from or write data to the CPU cache rather than reading/writing to memory 212, which may improve the speed of these operations. In some examples, a database cache may be created in which certain data from a database 218 is cached in a separate smaller database in a memory separate from the database, such as in RAM 204 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

FIGS. 3A-3D are a continuous illustration of various features of some disclosed implementations using the system 100 of FIG. 1. Specifically, FIGS. 3A-3D illustrate how a visualization application can be configured to enable editing of data stored in a database, such as database 106. Initially, a user adds a new visualization or selects an existing visualization to edit. Creating a new visualization or editing an existing visualization causes the data visualization application 112 to display the user interface 300 shown in FIGS. 3A-3D via a client device 104, such as through a web browser. The user uses the client device 104 to input data into the appropriate fields as shown in Table 1 below. Using the writeback configuration panel 300, the user configures the writeback panel 400 (shown and described in FIG. 4). During configuration, the user identifies the visual that will be enabled for writeback (where "writeback" means the ability to edit data directly to the database 106 from the visualization application 112). The user can also indicate whether multiple rows can be selected within the visual simultaneously for editing and the number of rows that are selectable. Further, the user can designate the specific database columns that can be edited. Each column that will be editable will need its own configuration, including a column identifier, the column name, and the data type allowed within that column. The API URL and AppID are used to identify where the writeback payload is passed when updating the database with new data. When the user saves the configuration, it is committed to the database 106. For example, each writeback configuration is saved to database 106 (e.g., as a blob data structure) with a unique identifier that links the configuration with the writeback enabled report.

TABLE 1

| Element | Field Name | Field Description |
|---|---|---|
| 302 (FIG. 3A) | Title | Name of visualization |
| 304 (FIG. 3A) | Description | Textual description of the visualization |
| 306 (FIG. 3A) | Report URL | URL for visualization within application |
| 308 (FIG. 3A) | Report Type | Determines if the report requires secured filtering of report data based on user identity |
| 310 (FIG. 3A) | Category | Determines the category that the report name will appear under for purposes of visual organization |
| 312 (FIG. 3A) | Content Tags | Determines groups of users that are allowed to access the report |
| 314 (FIG. 3B) | Show Report | Determines if the report will be visible in the KPMG Digital Gateway web application |
| 316 (FIG. 3B) | Featured Report | Determines if the report will be listed as a featured report in the KPMG Digital Gateway web application |
| 318 (FIG. 3B) | Allow Power BI Writebacks | Checkbox for indicating whether date writes may be made directly from the visualization application to the database |
| 320 (FIG. 3B) | Writeback API URL | URL of the API that enables data edits from the visualization application to the database |
| 322 (FIG. 3B) | Writeback API AppID | Identifier used for authorization to access the API necessary for data editing |
| 324 (FIG. 3B) | Power BI Page Name | The name of the page within the Power BI report that the configuration is associated with |
| 326 (FIG. 3B) | Power BI Visual Title | The name of the dataset in the Power BI reports that the configuration is associated with |
| 328 (FIG. 3B) | UI Type | Determines the type of user interface rules that will be used to render and initialize the writeback pane, as well as format the data payload that is transmitted for processing |
| 330 (FIG. 3B) | Shelf Title | The text that appears as the title of the writeback pane |
| 332 (FIG. 3C) | Submit Button Label | The text that appears on the submit button in the writeback pane |
| 334 (FIG. 3C) | Allow Selecting Multiple Rows | Checkbox for indicating whether users can select multiple rows for editing within the visualization application |
| 336 (FIG. 3C) | Maximum Number of Selectable Rows | If multiple selection is enabled, the maximum number of rows that can be selected for editing in the same writeback pane within the visualization application |
| 338 (FIG. 3C) | Requires Column Names | Checkbox used to determine if the name of the database column is to be shown in the writeback pane |
| 340 (FIG. 3C) | Identifier Column | Database column to be shown in the writeback pane to identify the database row to be edited within the visualization application |
| 342 (FIG. 3C) | Identifier Label | Label to be used in the writeback pane to identify the database row to be edited within the visualization application |
| 344 (FIG. 3C) | Required | Checkbox used to determine if the value for the database column is required |
| 346 (FIG. 3C) | Hidden | Checkbox used to determine if the value for the database column is automatically filled in and visually hidden from the user om the writeback pane |
| 348 (FIG. 3C) | Field Label | Database column to be shown in the writeback pane for editing within the visualization application |
| 350 (FIG. 3D) | Column Name | Label to be used in the writeback pane to identify the database column for editing within the visualization application |
| 352 (FIG. 3D) | Data Type | Type of field used to enter new data into the writeback pane to update the identified database column |
| 354 (FIG. 3D) | Dropdown Values | Values to be shown in the writeback pane if Data Type is indicated as dropdown |

TABLE 1-continued

| Element | Field Name | Field Description |
|---|---|---|
| 356 (FIG. 3D) | Allow Multiple Dropdown Selections | Checkbox for indicating whether multiple selections may be made within the writeback pane if Data Type is indicated as dropdown |

Figure 3A:
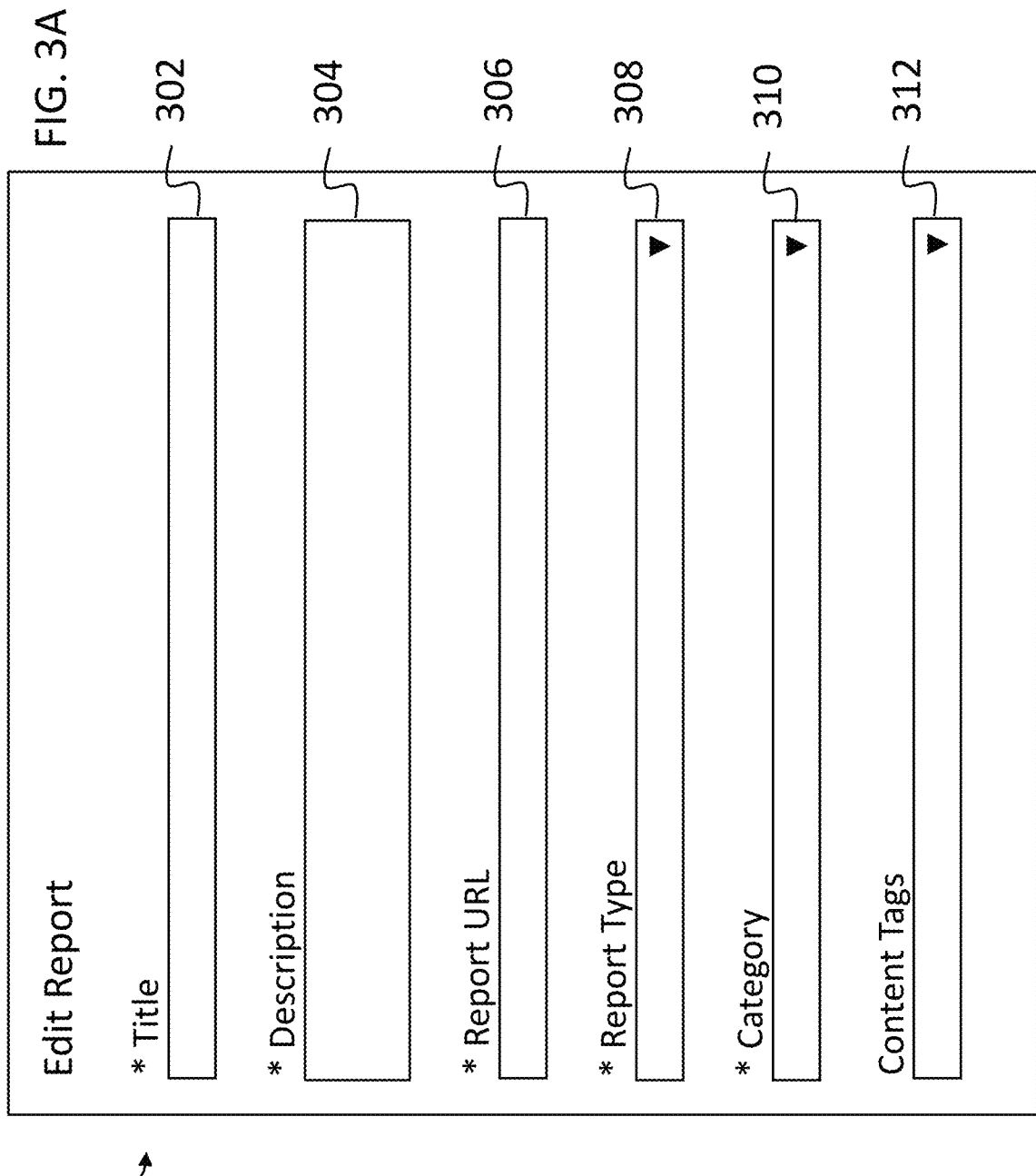
FIGS. 3A-3D are an illustration of various features of some disclosed implementations using the system of FIG. 1.
Figure 3B:
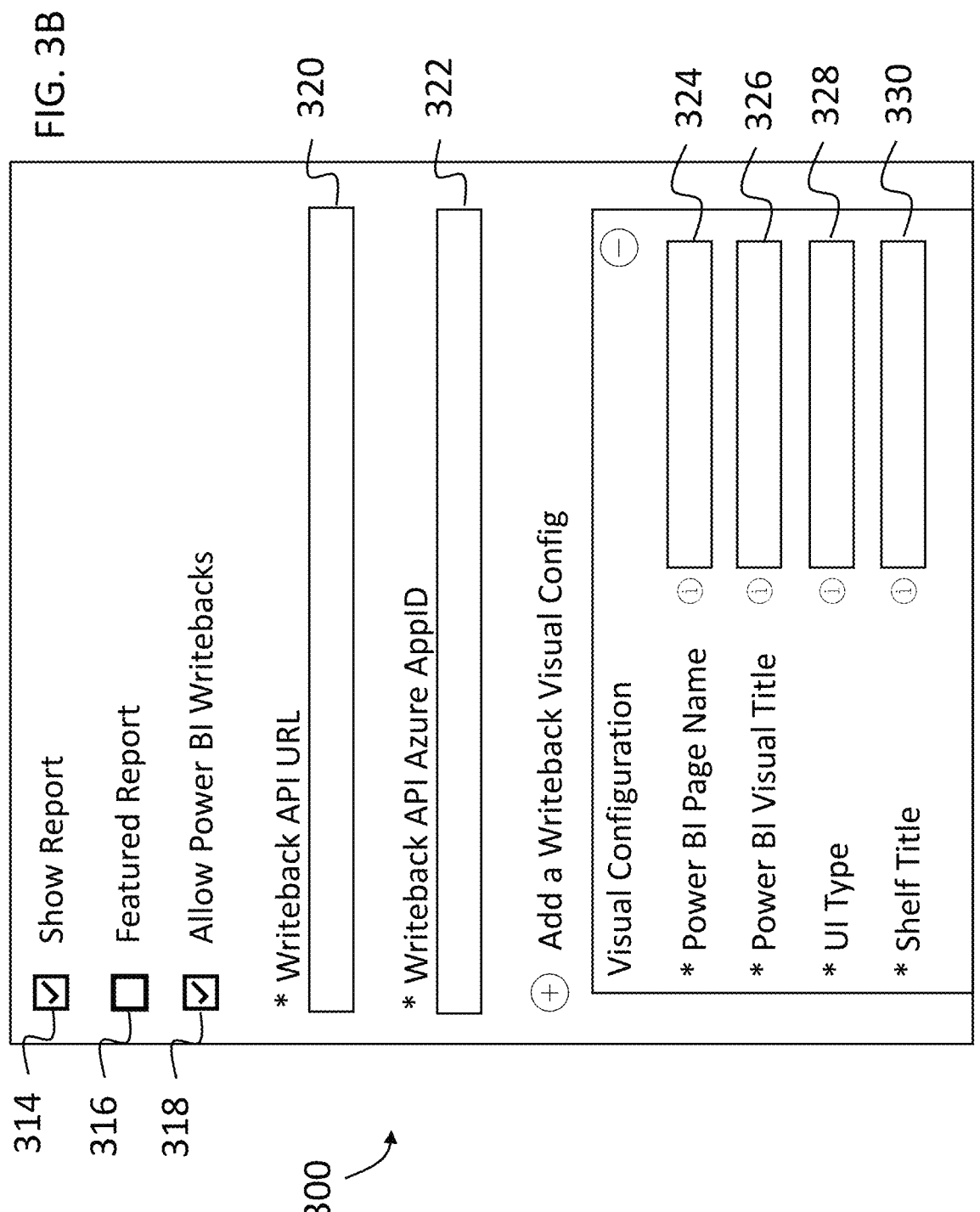
Figure 3C:
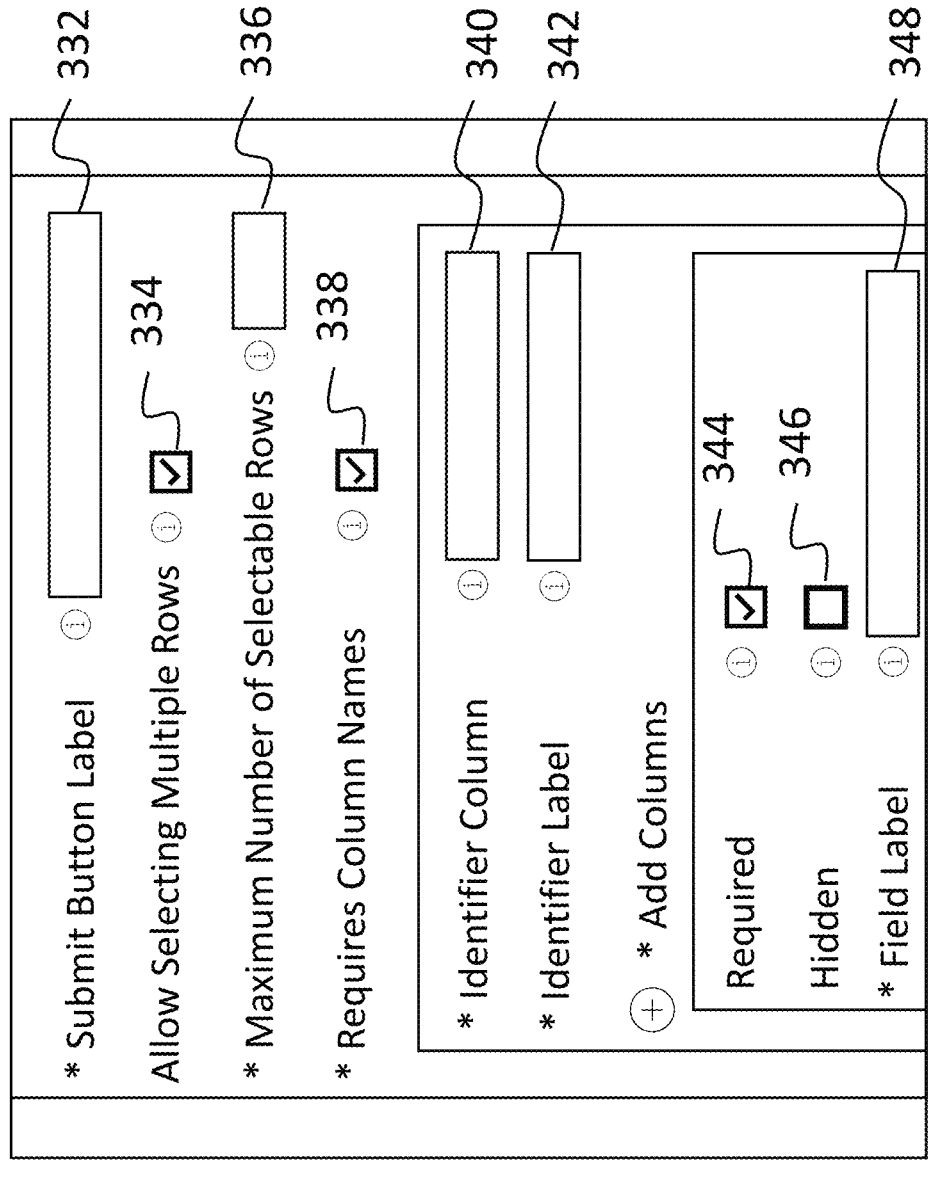
Figure 3D:
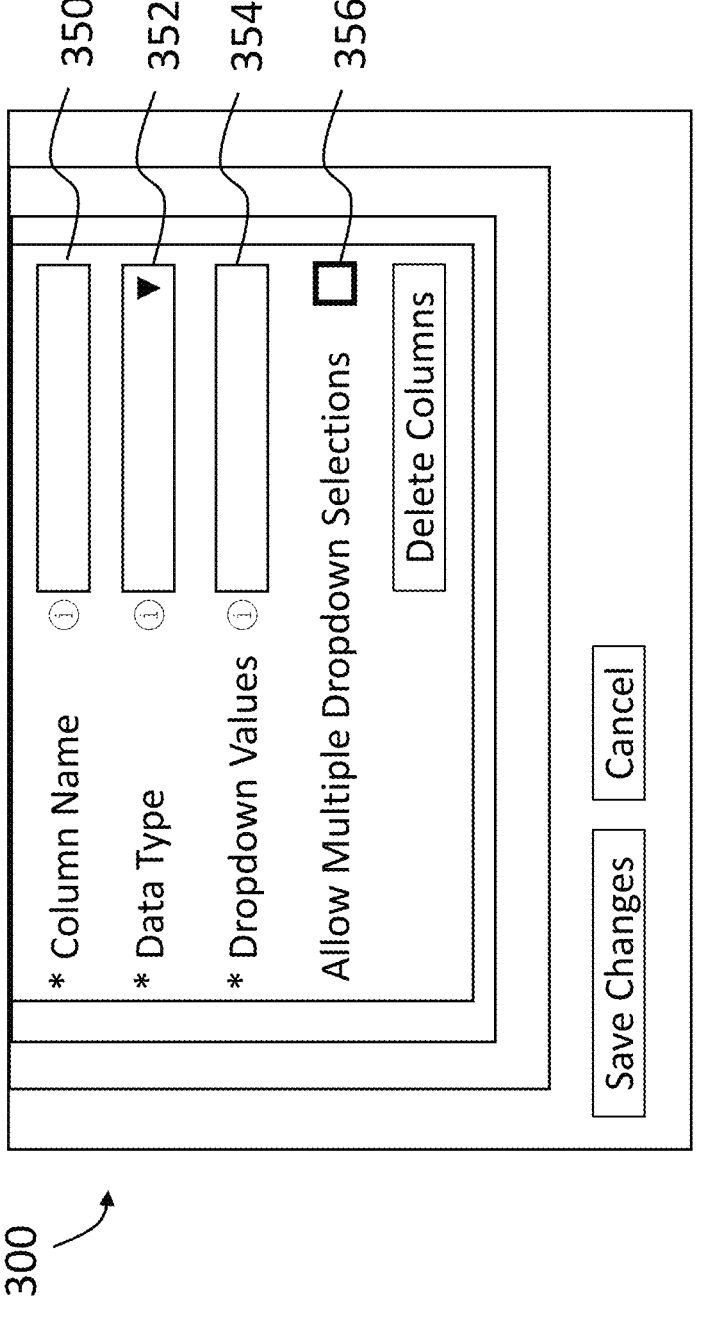
Figure 4:
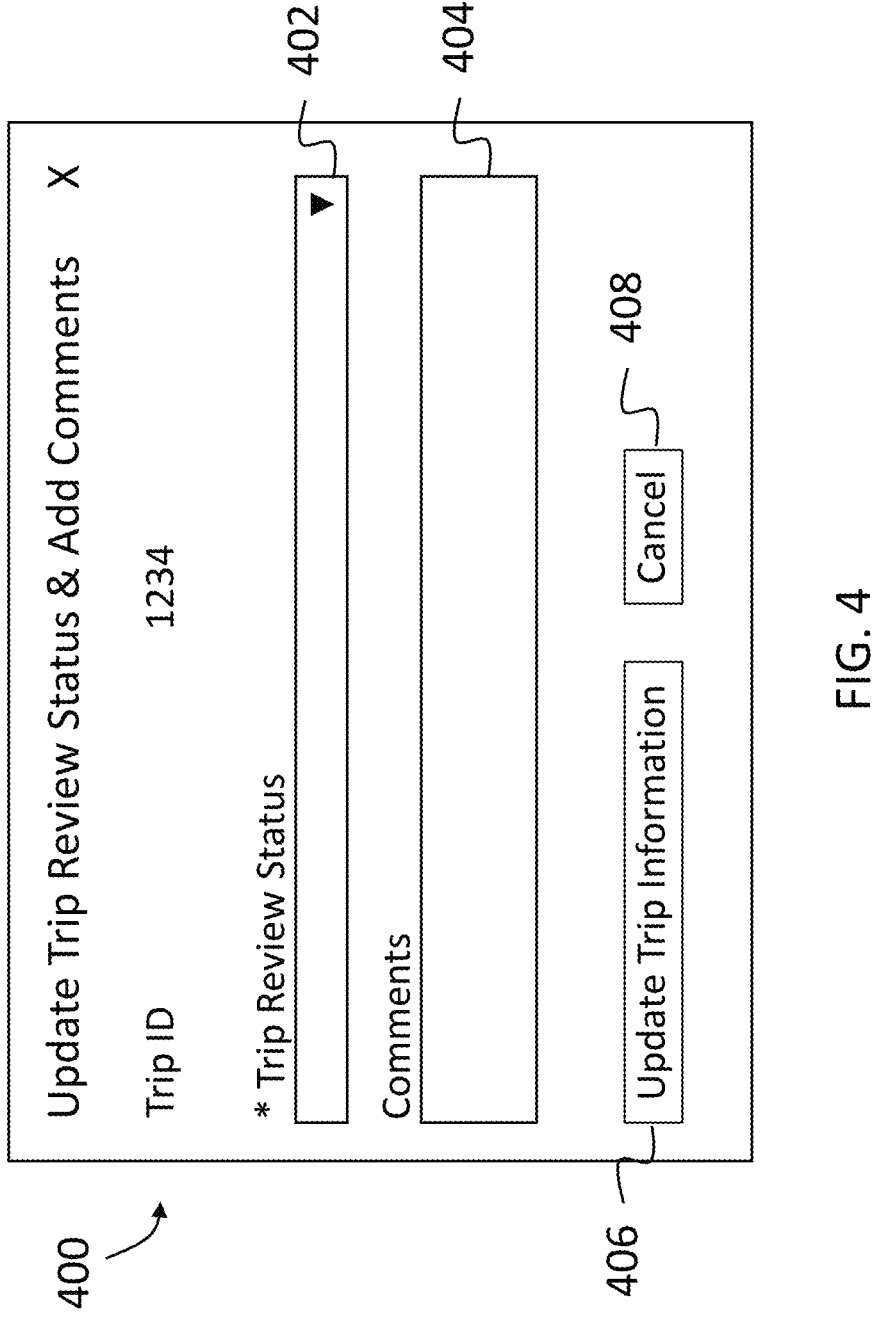
FIG. 4 is an illustration of various features of some disclosed implementations using the system of FIG. 1.

FIG. 4 is an illustration of various features of some disclosed implementations using the system 100 of FIG. 1. Specifically, FIG. 4 is an illustration of an embodiment of a writeback panel 400. When a user selects a row or other element in a visualization within the visualization application 112, the writeback panel 400 is presented to the user also within the visualization application 112. The contents and location of the contents of the writeback panel 400 depend on the configuration entered into the writeback configuration panel 300 of FIGS. 3A-3D. For example, as shown in FIG. 4, for the selected row with Trip ID of 1234, the field named "Trip Review Status" is enabled such that the user can change the value of that field via the writeback panel 400. In the writeback panel 400, the user can select a new status from the dropdown list 402 based on the dropdown values 354 entered into the writeback configuration panel 300 of FIGS. 3A-3D. The new value is sent to the database 106 by the visualization application 112 and the database 106 and visual are updated to reflect the change. Within the writeback panel 400, the user can also enter comments via the text field 404, which would also have been defined in the writeback configuration panel 300. When the user is ready to commit the changes to the database 106, they select the submit button 406 (here named "Update Trip Information" via the writeback configuration panel 300). If the user instead decides against committing the change to the database 106, they can cancel the operation with the cancel button 408.

Figure 5:
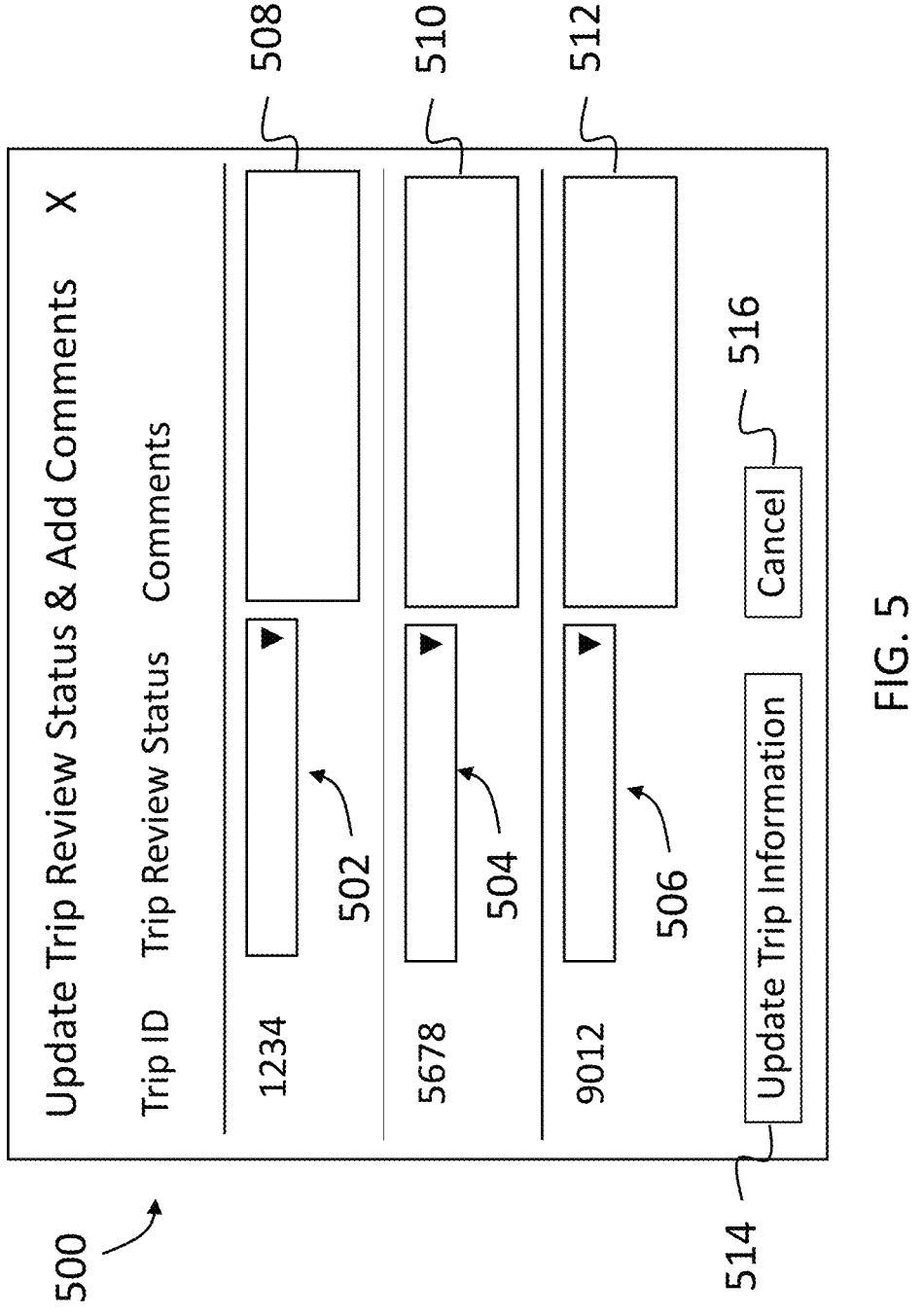
FIG. 5 is an illustration of various features of some disclosed implementations using the system of FIG. 1.

FIG. 5 is an illustration of various features of some disclosed implementations using the system 100 of FIG. 1. Specifically, FIG. 5 is an illustration of another embodiment of a writeback panel 500 where the user created the writeback operation to enable multiple row selection via checkbox 334 in the writeback configuration panel 300 of FIGS. 3A-3D. When a user selects multiple rows (in FIG. 5, the user had selected three rows) in a visualization within the visualization application 112, the writeback panel 500 is presented to the user also within the visualization application 112. The contents and location of the contents of the writeback panel 500 depend on the configuration entered into the writeback configuration panel 300 of FIGS. 3A-3D. For example, as shown in FIG. 5, for the selected rows with Trip IDs of 1234, 5678, and 9012, a respective field named "Trip Review Status" is enabled such that the user can change the value of each respective field via the writeback panel 500. The user can change one or multiple of the displayed fields and each field can have different values before or after the change. In the writeback panel 500, the user can select a new status from the dropdown list 502 for Trip ID 1234 based on the dropdown values 354 entered into the writeback configuration panel 300 of FIGS. 3A-3D. Similarly, the user can select a new status from the dropdown list 504 for Trip ID 5678 and/or a new status from the dropdown list 506 for Trip ID 9012, also based on the dropdown values 354. The new values are sent to the database 106 by the visualization application 112 and the database 106 and visual are updated to reflect the change. Within the writeback panel 500, the user can also enter comments via the text fields 508, 510, and 512, each corresponding to a different Trip ID, and which would also have been defined in the writeback configuration panel 300. When the user is ready to commit the changes to the database 106, they select the submit button 514 (here named "Update Trip Information" via the writeback configuration panel 300). If the user instead decides against committing the change to the database 106, they can cancel the operation with the cancel button 516.

Figure 6:
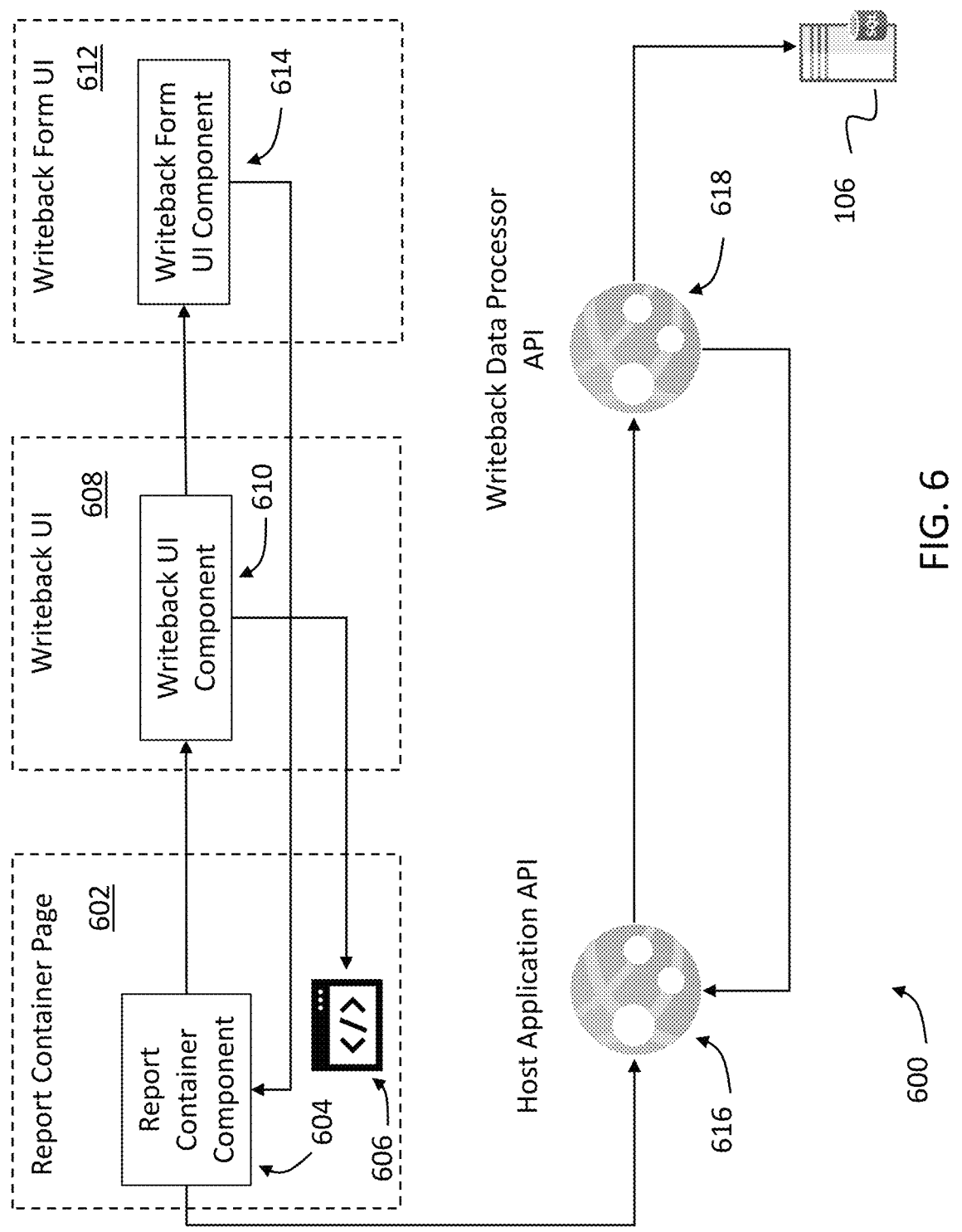
FIG. 6 is an illustration of an example method of editing data directly within a visualization using the system of FIG. 1.

FIG. 6 is an illustration of an example method 600 of editing data directly to a database, such as database 106, within a visualization using the system 100 of FIG. 1. Initially, a Report Container Page 602 including a Report Container Component 604 and an embedded, writeback-enabled visualization 606 sends the writeback configuration (created using writeback configuration panel 300 of FIGS. 3A-3D) to a Writeback User Interface (UI) 608 that includes a Writeback UI Component 610. The Writeback UI Component 610 then "listens" for a data row selection in the writeback-enabled visualization 606. When a row is selected, the Writeback UI Component 610 creates an instance of a Writeback Form UI 612 (i.e., the writeback panel 400 of FIG. 4 or 500 of FIG. 5) that includes a Writeback Form UI Component 614 based on the configuration parameters entered into the writeback configuration panel 300. The user changes the information in the Writeback Form UI Component 614 as desired and, when the user instructs the Writeback Form UI Component 614 to update the information (e.g., by clicking the submit button 406 of FIG. 4 or 514 of FIG. 5), the Writeback Form UI Component 614 sends the updated information to the Report Container Component 604.

The Report Container Component 604 sends the updated information to a host application API 616, which prompts the cloud hosting platform to generate a secure token for transmission to a Writeback Data Processor API 618 identified in the writeback configuration panel 300 via the Writeback API URL 320 and the Writeback API AppID 322 (both shown in FIG. 3B). The secure token may be generated using any known securitization process. The host application API 616 validates the token to ensure the user has sufficient access or permissions to perform the requested action, both of which actions may be taken using any known validation and permissions processes. The host application API 616 then sends the updated information to the Writeback Data Processor API 618, which accesses the database 106 and modifies the data based on the updated information. The Writeback Data Processor API 618 then sends a success/failure message to the host application API 616.

The updated information for commitment to the database 106 is transmitted throughout the system 100 as a JSON message as shown below. If multiple rows are edited and changes submit at the same time, all changes are sent to the database 106 in a single JSON message. Alternatively, separate JSON messages could be sent serially.

Code Snippet 1

```
{
    "dataRows": [
        {
            "tripId2": 1234,
            "version": "1",
            "status": "1",
            "comments": "Updated on May 16, 2023"
        }
    ]
}
```

In some embodiments, where certain customizations are needed, rather than development of custom user interfaces (e.g., visualization application 112, writeback configuration panel 300, or writeback panel 400/500), the invention enables format and logic changes in the messaging. For example, a data formatter can reformat the JSON message shown in Code Snippet 1 above to fit differing needs.

Code Snippet 2

```
{
    "trips": [
        {
            "tripId": 1234,
            "tripVersion": "1",
            "comments": "Updated on May 16, 2023"
            revisionStatus": {
                "text": "In Progress",
                "id": "2",
            }
        }
    ],
    "timestamp": "2023-05-16T09:00:00.000Z"
}
```

Similarly, a data initializer can perform custom logic to prepopulate the writeback configuration panel 300 and/or the writeback panel 400/500. For example, when a row is selected in the visualization application 606, the Writeback UI Component 610 creates an instance of the Writeback Form UI Component 614 based on the configuration parameters entered into the writeback configuration panel 300 and uses the custom logic to query the database 106 for the desired data for those fields that are writeback enabled.

Figure 7:
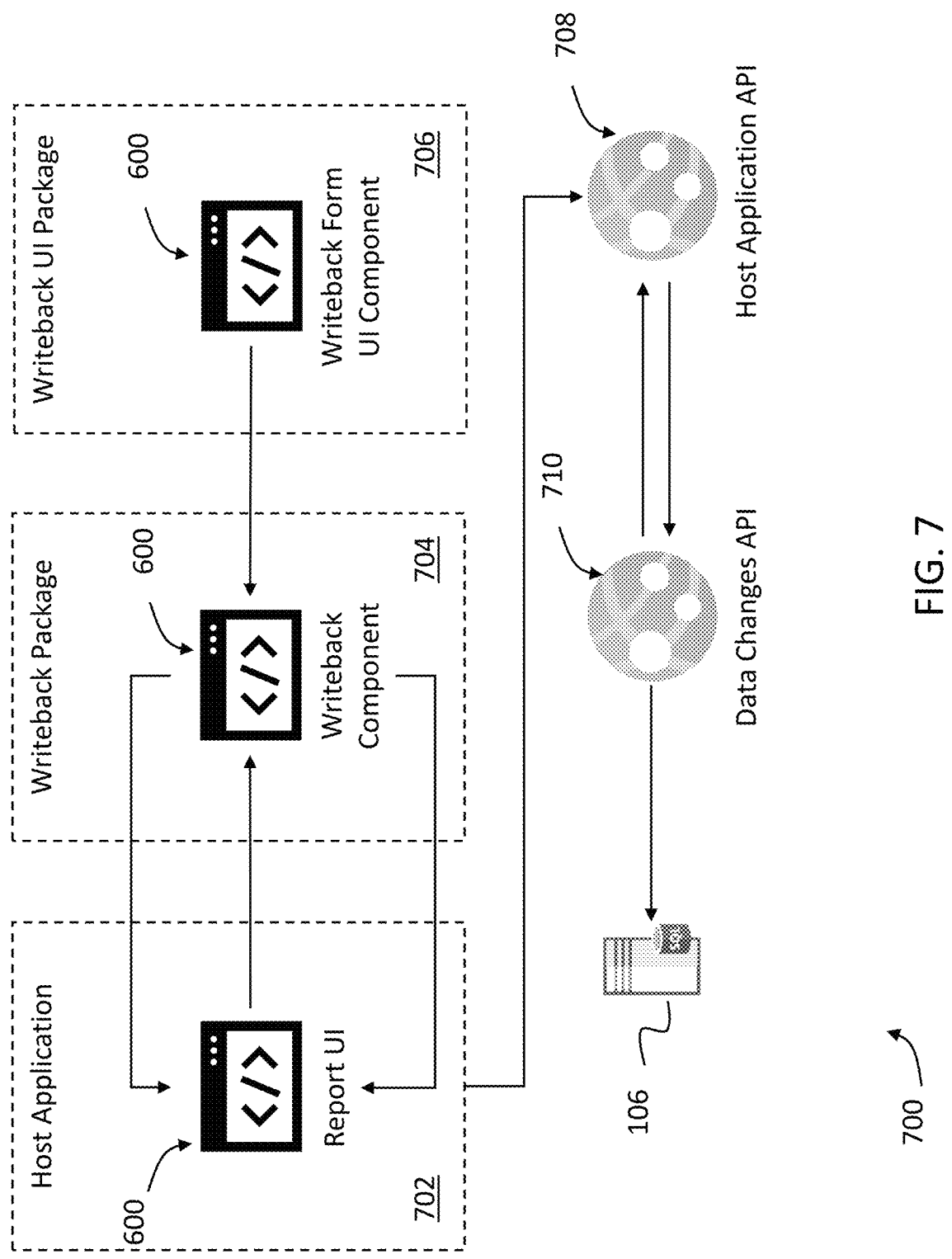
FIG. 7 is an illustration of another example method of editing data directly within a visualization using the system of FIG. 1.

FIG. 7 is an illustration of another example method 700 of editing data directly to a database, such as database 106, within a visualization using the system 100 of FIG. 1. In this embodiment, the visualization application 112 can be thought of as three components-a host application 702, a Writeback package 704, and a Writeback UI package 706. The host application 702 receives data from the Writeback package 704 and sends configuration information to the Writeback package 704, including whether the writeback function is enabled, the UI type, and the elements within the visualization application 112 that have writeback enabled via the writeback configuration. The host application 702 also subscribes to visualization application events that occur, which include when a writeback-enabled visualization is loaded into the host application 702 and when a user selects a row within a writeback-enabled visualization.

The Writeback package 704 sends data to the host application 702, receives configuration information from the host application 702, and updates the host application 702 when events occur within the visualization. The Writeback package 704 also interacts with the Writeback UI package 706. For example, the Writeback package 704 receives event notifications and associated data from the Writeback UI package 706 and sends those event notifications and associated data to the host application 702.

The host application 702 also sends data via a host application API 708 and a server-side Data Modification or Data Changes API 710 to the database 106. Specifically, the host application 702 sends data through the client-side host application API 708, which forwards the data through the server-side Data Modification API 710 to the database 106, which applies the data to the specified field or fields. The server-side Data Modification API 710 forwards success/failure indications through the client-side host application API 708, which sends the indications for display via the host application 702.

The method and systems described herein enable users to edit data directly in a database using a visualization tool such as Microsoft Power BI. Rather than requiring the user to exit the visualization, update the data, and re-display a refreshed visualization, the invention enables users to eliminate steps. Thus, implementations improve the efficiency with which computers update datasets within databases and update visualization tools.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A computer-implemented method for updating data in a database directly from a visualization application, the method comprising:

displaying the visualization application on a client device;

displaying a writeback configuration panel on the client device, the writeback configuration panel including one or more user-selected data fields to be changed in the database for a specified database column and being displayed within a web browser application different from the visualization application, wherein the user selection of data fields to be changed enables changes only to those data fields directly in the database via the visualization application;

creating a writeback configuration file via the writeback configuration panel displayed within the web browser application, the writeback configuration file indicating user-selected specific one or more database columns that are capable of being updated directly from the visualization application and including a writeback application programming interface (API) universal resource locator (URL) that identifies where updated data is to be sent;

transmitting the updated data, by the visualization application, to a processing application programming interface (API) on a server communicatively coupled to the client device;

updating the database with the updated data for the specified database column; and responding, by the processing API, with a success or failure message that reflects the update status.

2. The computer-implemented method of claim 1, wherein creating a writeback configuration file comprises identifying an application identifier.

3. The computer-implemented method of claim 2, further comprising listening for selection of a row, by a user of the visualization application, where the row is indicated by the writeback configuration file as being editable directly through the writeback panel.

4. The computer-implemented method of claim 3, wherein displaying a writeback panel comprises:

sensing the selection of an editable row in the visualization application via a data row selection event; and generating an instance of the writeback panel in response to the data row selection event.

5. The computer-implemented method of claim 2, further comprising generating a secure token, by a visualization API, and verifying the secure token for database access, by the writeback API.

6. An apparatus for updating data in a database directly from a visualization application, the apparatus comprising:

one or more processors; and memory storing instructions that, when executed by the one or more processors, cause the apparatus to:

display the visualization application;

display a writeback configuration panel responsive to a user command for data update, the writeback configuration panel including one or more user-selected data fields to be changed in the database for a specified database row and database column and being displayed within a web browser application different from the visualization application, wherein the user selection of data fields to be changed enables changes only to those data fields directly in the database via the visualization application;

based on user input, create a writeback configuration file via the writeback configuration panel displayed within the web browser application, the writeback configuration file indicating user-selected specific one or more database columns that are capable of being updated directly from the visualization application and including a writeback application programming interface (API) universal resource locator (URL) that identifies where updated data is to be sent;

transmit the updated data, by the visualization application, to a processing application programming interface (API) on a server communicatively coupled to the apparatus; and receive a response, from the processing API, with a success or failure message that reflects whether the specified database column was updated.

7. The apparatus of claim 6, wherein the instructions, when executed by the one or more processors, further cause the apparatus to receive an identify of an application identifier.

8. The apparatus of claim 7, wherein the instructions, when executed by the one or more processors, further cause the apparatus to listen for selection of a row, by a user of the visualization application, where the row is indicated by the writeback configuration as being editable directly through the writeback panel.

9. The apparatus of claim 8, wherein the instructions, when executed by the one or more processors, further cause the apparatus to:

sense the selection of an editable row in the visualization application via a data row selection event; and generate an instance of the writeback panel in response to the data row selection event.

10. The apparatus of claim 7, wherein the instructions, when executed by the one or more processors, further cause the apparatus to access a visualization API to generate a secure token and to access the writeback API to verify the secure token for database access.

11. A non-transitory machine-readable medium storing instructions that, when executed by one or more processors, cause the one or more processors to perform the steps comprising:

displaying a visualization application on a client device;

displaying a writeback configuration panel on the client device, the writeback configuration panel including one or more user-selected data fields to be changed in a database for a specified database column and being displayed within a web browser application different from the visualization application, wherein the user selection of data fields to be changed enables changes only to those data fields directly in the database via the visualization application;

creating a writeback configuration file via the writeback configuration panel displayed within the web browser application, the writeback configuration file indicating user-selected specific one or more database columns that are capable of being updated directly from the visualization application and including a writeback application programming interface (API) universal resource locator (URL) that identifies where updated data is to be sent;

transmitting the updated data, by the visualization application, to a processing application programming interface (API) on a server communicatively coupled to the client device;

updating the database with the updated data for the specified database column; and responding, by the processing API, with a success or failure message that reflects the update status.

* * * * *